United States Patent Office 2,923,664
Patented Feb. 2, 1960

2,923,664

HEMOSTATIC PRODUCT

Clayton M. Cook, North Brunswick, N.J., and Charles E. Moser, Ambler, and William H. Ashton, Philadelphia, Pa., assignors to Johnson & Johnson, a corporation of New Jersey No Drawing. Application September 11, 1957
Serial No. 683,222

4 Claims. (Cl. 167—82)

This invention relates to an absorbable surgical pellet comprising fibrous cellulose glycolic acid ether having mixed therewith as a binder a small proportion of the sodium salt of cellulose glycolic acid ether. The invention also relates to methods of preparation of such pellets. More particularly, invention relates to such materials wherein the cellulose glycolic acid is characterized by being both completely absorbable and hemostatic.

Cellulose glycolic acid ether materials which are characterized by being both completely absorbable and hemostatic are known, and certain surgical pellets containing such materials are known.

The completely absorbable cellulose glycolic acid ethers having a degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature. Preferably, this viscosity is in the range not above 14 seconds. For the desired hemostatic activity, the cellulose glycolic acid ether should have a degree of substitution in the range of from about 0.5 to about 2.0, preferably, from about at least 0.7.

The degree of substitution (D.S.), a term commonly employed in connection with cellulose derivatives of the nature of the invention hemostatic agents, is an important property and indicates the average number of substituent groups per glucose unit in the cellulose molecular chain. Since there are three hydroxyl groups and hence three possible points of substitution per glucose unit, the maximum D.S. is 3.0.

The art is confronted by the problem of providing absorbable surgical pellets from cellulose glycolic acid ether, from satisfactory materials which are both completely absorbable and hemostatic. The discoveries associated with the invention relating to solution of the above problem and the objects achieved in accordance with them as set forth herein include: the provision of a process for preparing an absorbable surgical pellet comprising cellulose glycolic acid ether in light fibrous powder form having a degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature, said cellulose ether having a degree of substitution in the range of 0.5 to 2.0, mixed with the sodium salt of such an ether, said mixture comprising 2 to 5 parts by weight of the sodium salt per 100 parts of the mixture thereof with the said acid ether, which process comprises forming said mixture and mixing water therewith in an amount and range of 100 to 200 parts of water per 100 parts of said mixture, granulating the resulting wet mixture, and drying the resulting granules, and then compressing into tablets; the provision of a completely absorbable and hemostatic tablet resulting therefrom; the provision of a process wherein the tablet is sealed in an isolated zone permeable to vapor but impermeable to microorganisms, and sterilized; the provision of the resulting sterilized completely absorbable and hemostatic tablet; and other objects which will be apparent as details or embodiments of the invention are set forth hereinafter.

In order to facilitate a clear understanding of the invention, the following preferred specific embodiments are described in detail.

*Example 1*

Fibrous cellulose glycolic acid ether (air dried at 70° F.), in a proportion of 98 parts by weight is mixed with sodium cellulose glycolic acid ether in a proportion of 2 parts by weight. The cellulose glycolic acid has a degree of polymerization corresponding to a viscosity of 11.4 seconds and a degree of substitution of 1.30. To this mixture there is added water in a proportion of 140 parts by weight and the resulting mixture is mixed for about 15 minutes in a dough mixer using a pastry knife agitator (such as a mixer made by the Hobart Manufacturing Company, Troy, Ohio).

The resulting wetted mass is passed through an oscillating granulator having a #14 screen (such as a granulator manufactured by the J. J. Stokes Machine Company, of Philadelphia, Pa.) wherein the screen contains 14 equal square spaces per linear inch and the wire diameter is 0.028 inch.

The granulated material is collected, and dried at 120° F. for 18 hours. Then it is passed through an oscillating granulator having a #8 screen, wherein the screen contains 8 equal square spaces per linear inch and the wire diameter is 0.041 inch, in order to break up the larger aggregates. The resulting material is then compressed into tablets in conventional tableting apparatus. In this instance, the tablets were 75 mg. in weight and had a hardness of 5 to 8 kg. (apparatus and method of U.S. Patent No. 2,041,869).

This procedure produced satisfactory tablets, and the product had excellent absorption characteristics when tested by wetting with water.

The procedure was repeated except that 150 parts of water instead of 140 was used, and similar fully satisfactory results were obtained.

The resulting tablet product may be sterilized by treatment with a chemical sterilizing material. In one method, each individual tablet may be sealed in a glassine or the like envelope and a plurality of tablets may be placed in a jar or container. A chemical sterilizing material such as aqueous formaldehyde vapor or a mixture of ethylene oxide with a small proportion of carbon dioxide may be added, and the contents of the jar exposed thereto for a time to achieve sterilization, e.g., 1 hour to 2 days at 150° F. The glassine or the like wrapping may be replaced by an equivalent vapor permeable material which is impervious to microorganisms. In packaging the tablet in a multiple unit sheet package, each packet therein contains one tablet. The package may be prepared by laminating a sheet of glassine or the like super-calendered paper having a polyethylene coating on one side to a sheet of 25 lbs. per ream sterilizable glassine paper or the like. The package may be arranged in two rows containing three units per row.

Tablets prepared and packaged and sterilized as discussed above gave excellent absorption and swelling characteristics when wetting with water. The foregoing results are indeed surprising in view of the many attempts to prepare a satisfactory product of this type including the following:

*Example A*

Following the above procedure except using 160 parts of water gives a mixture which is too wet to granulate and produces a plastic mass which is unsatisfactory or unusable.

*Example B*

Following the above procedure except using one part of the sodium salt with 99 parts of the acid, and 170 parts of water made the dried granules too soft and also a material which disintegrates into a powder in the screening test and this material could not be compressed into the desired tablets with conventional equipment.

*Example 2*

Following the procedure of Example 1, except using 3 parts of the sodium salt and 97 parts of the acid, gave completely satisfactory results both as to preparation and to the characteristics of the final tablet.

*Example 3*

Following the procedure of Example 1, except using 4 parts of the sodium salt and 96 parts of the acid, gave completely satisfactory results both as to preparation and to the characteristics of the final tablet.

*Example 4*

Following the above procedure, except using 5 parts of sodium salt and 95 parts of the acid, and 170 parts of water gave a material which was satisfactory for preparation of tablets. These tablets were satisfactory; however, the absorption characteristics thereof were somewhat lower than those of the preceding examples.

*Example C*

Following the procedure of Example 4, except using 6 or more parts of the sodium salt per 100 parts of mixture parts thereof with the acid give products which are unsatisfactory or inoperative since the absorption characteristics are too slow or too low.

*Example D*

Following the procedure of Example 1, except using the granular densified form of sodium salt and the acid and using 125 parts of water, tablets were made which were unsatisfactory because the absorption was too slow and the swelling characteristics were inferior. In addition, the wetted tablets disintegrated into unsatisfactory hard granules. This shows that the granular densified type of material is unsatisfactory.

In the production of tablets by conventional procedures, the desirable light fibrous powder form of the acid cannot be made into satisfactory tablets inasmuch as these are non-uniform both as to weight and thickness. If they are subjected to a precompression or so-called "slugging" process, the resulting tablets are unsatisfactory and have poor wettability characteristics, and this is reflected in poor tissue absorbability, as well as reduced clotting or hemostatic power.

The heretofore described highly satisfactory results obtained by using the separately prepared sodium salt of the cellulose glycolic acid ether as a binder are indeed surprising when one considers that unsatisfactory tablets are obtained with usual binders such as polyvinylpyrrolidone, algin, pectin, locust bean gum, gum flour, oatmeal gum, d-sorbitol, dextrose, lactose and corn starch.

The sodium salt of cellulose glycolic acid is commercially available in the form of a light fibrous powder and it may be converted to the corresponding cellulose glycolic acid ether in conventional manner, and the resulting product is of similar physical form.

Comparable results of the foregoing are obtained in various modifications thereof including the following: The water content in the granulation mixture is in the range of about 100 to 200 parts of water to 100 parts powder mixture. A preferred range of water content is in the range of 120 to 160 parts. It is preferred to mix the separately prepared sodium salt with the cellulose glycolic acid ether both in dry state, and then adding the water thereto.

If a partially neutralized cellulose glycolic acid is prepared having a salt content equivalent to that in the above discussed satisfactory examples, the resulting product will not give satisfactory tablets.

Alternatively, cellulose hydroxy-propionic acid ether (also called free acid carboxyethylcellulose) can be used in place of cellulose glycolic acid ether. Sodium cellulose hydroxy-propionic acid ether can be used in place of sodium cellulose glycolic acid ether.

The tablets may be in any convenient form depending upon its ultimate use. One form which is especially suited for dental purposes is in the shape of a somewhat rounded cone, which is adapted to fit into the recess resulting from the extraction of a tooth.

In view of the foregoing disclosures, variations or modifications thereof will be apparent, and it is intended to include within the invention all such variations and modifications except as do not come within the scope of the appended claims.

We claim:

1. A process for preparing an absorbable surgical pellet comprising a mixture of cellulose glycolic acid ether in light fibrous power form having a degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature, said cellulose ether having a degree of substitution in the range of 0.5 to 2.0, and the sodium salt of such an ether, said mixture comprising 2 to 5 parts by weight of the sodium salt per 100 parts of the mixture thereof with the said acid ether, which process comprises forming said mixture of said cellulose glycolic acid ether with the separately prepared sodium salt of such an ether and mixing water therewith in the amount in the range of 100 to 200 parts of water per 100 parts of said mixture, granulating the resulting wet mixture, and drying the resulting granules, and then compressing into pellets.

2. An absorbable surgical pellet prepared by the process of claim 1.

3. A process of claim 1 wherein the tablet is sealed in an isolated zone permeable to vapor but impermeable to microorganisms, and sterilized.

4. A sterilized product obtained by the process of claim 3.

References Cited in the file of this patent

UNITED STATES PATENTS

| | | |
|---|---|---|
| 2,291,149 | Connor | July 28, 1942 |
| 2,386,416 | Wilhelm | Oct. 9, 1945 |
| 2,772,999 | Masci et al. | Dec. 4, 1956 |
| 2,773,000 | Masci et al. | Dec. 4, 1956 |

OTHER REFERENCES

Silver et al.: "Manuf. of Compressed Tablets," F. V. Stokes Machine Co., 1944, pp. 5-25.

UNITED STATES PATENT OFFICE

CERTIFICATE OF CORRECTION

Patent No. 2,923,664                                      February 2, 1960

Clayton M. Cook et al.

It is hereby certified that error appears in the printed specification of the above numbered patent requiring correction and that the said Letters Patent should read as corrected below.

Column 4, line 12, for "neutrolized" read -- neutralized --; line 35, for "power" read -- powder --.

Signed and sealed this 19th day of July 1960.

(SEAL)
Attest:

KARL H. AXLINE
Attesting Officer

ROBERT C. WATSON
Commissioner of Patents